(12) United States Patent
Miyazaki (10) Patent No.: US 8,383,711 B2
(45) Date of Patent: Feb. 26, 2013

(54) RUBBER COMPOSITION FOR TIRE

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 438 days.

(21) Appl. No.: 12/740,956

(22) PCT Filed: Oct. 10, 2008

(86) PCT No.: PCT/JP2008/068449
§ 371 (c)(1),
(2), (4) Date: Apr. 30, 2010

(87) PCT Pub. No.: WO2009/072350
PCT Pub. Date: Jun. 11, 2009

(65) Prior Publication Data
US 2010/0224299 A1 Sep. 9, 2010

(30) Foreign Application Priority Data

Dec. 7, 2007 (JP) ................................. 2007-317252
Oct. 3, 2008 (JP) ................................. 2008-258546

(51) Int. Cl.
*C08K 3/30* (2006.01)
*B60C 1/00* (2006.01)
(52) U.S. Cl. ........................................ 524/418; 152/525
(58) Field of Classification Search ................... 524/418
See application file for complete search history.

(56) References Cited

U.S. PATENT DOCUMENTS

| 7,737,209 | B2 * | 6/2010 | Miyazaki | ..................... 524/508 |
| 2006/0047056 | A1 | 3/2006 | Miyazaki | |
| 2006/0272760 | A1 | 12/2006 | Teratani et al. | |

FOREIGN PATENT DOCUMENTS

| JP | 5-320421 A | 12/1993 |
| JP | 07-237405 A | 9/1995 |
| JP | 11-209519 A | 8/1999 |
| JP | 2001-114938 A | 4/2001 |
| JP | 2002-284930 A | 10/2002 |
| JP | 2002-284933 A | 10/2002 |
| JP | 2003-113284 A | 4/2003 |
| JP | 2003213045 | * 7/2003 |
| JP | 2005-248021 A | 9/2005 |
| JP | 2006-63143 A | 3/2006 |
| JP | 2006-124503 A | 5/2006 |
| JP | 2007-146088 A | 6/2007 |
| JP | 2007-169558 A | 7/2007 |
| JP | 2007-302865 A | 11/2007 |
| JP | 2008-24913 A | 2/2008 |
| JP | 2008-174585 A | 7/2008 |
| WO | WO 02/02356 A1 | 1/2002 |

OTHER PUBLICATIONS

Translation of JP 2003213045, Jul. 30, 2003.*

* cited by examiner

*Primary Examiner* — Hui Chin
(74) *Attorney, Agent, or Firm* — Birch, Stewart, Kolasch & Birch, LLP (57) ABSTRACT

The present invention relates to a rubber composition for a sidewall, a clinch and an insulation comprising 20 to 60 parts by mass of filler, 1.0 to 4.0 parts by mass of sulfur and 0.1 to 10 parts by mass of at least one vulcanization accelerating aid selected from a group comprising a citraconimide compound, an organic thiosulfate compound, an alkylphenol-sulfur chloride condensate, a compound represented by the formula (2) and a metal salt of methacrylic acid represented by the formula (3), based on 100 parts by mass of a diene rubber component comprising 10 to 70% by mass of at least one diene rubber component (a) selected from a group comprising a solution polymerization-modified styrene-butadiene rubber, a tin-modified butadiene rubber and a butadiene rubber whose terminal is modified with a compound represented by the formula (1), and 20 to 80% by mass of a diene rubber component (b) other than the diene rubber component (a) for the purpose of improving rolling resistance and steering stability.

3 Claims, 2 Drawing Sheets

RUBBER COMPOSITION FOR TIRE

TECHNICAL FIELD

The present invention relates to a rubber composition for a sidewall, a clinch and/or an insulation in a tire.

BACKGROUND ART

Various means have been recently taken up for reducing the rolling resistance of a tire (for improving rolling resistance property) or for improving the steering stability of a vehicle in order to save energy. As the means, it is mentioned that a tire tread is made as double layer structure (inner layer and surface layer) and a rubber composition exhibiting superior rolling resistance and steering stability is used for a base tread being its inner layer. Further, it is mentioned that a rubber composition superior in rolling resistance and durability (crack growth resistance) is used in the sidewall, clinch and insulation and a rubber composition superior in abrasion resistance is used in a clinch.

In order to improve the rolling resistance and steering stability, there are disclosed technology that reduces loss tangent (tan δ) and reduce the rolling resistance of a tire by including a modified butadiene rubber and carbon black as a rubber composition for a base tread and technology that improves complex elastic modulus (E*) by including a polybutadiene rubber including 1,2-syndiotactic polybutadiene crystals and further reduces tan δ to improve the rolling resistance and steering stability by reducing the content of carbon black (for example, refer to Japanese Unexamined Patent Publication No. 2006-124503).

However, when a rubber having butadiene skeleton and a rubber having isoprene skeleton are included at same level in like manner as the combination of a butadiene rubber and a natural rubber as a diene rubber component, cure reversion occurs easily and it causes the reduction of E* and the increase of tan δ.

Consequently, although it is necessary for suppressing cure reversion that a styrene-butadiene rubber is included in a diene rubber component, the reduction of tan δ is not adequate only by including reinforcing fillers such as low reinforcing carbon black and silica in the styrene-butadiene rubber or by lessening the content of the reinforcing fillers.

Further, when a rubber composition for a base tread disclosed in Japanese Unexamined Patent Publication No. 2006-124503 is applied for a sidewall, a clinch and an insulation, the compatibility of low heat build-up property and elongation at break (durability) has been susceptible to improvement.

DISCLOSURE OF INVENTION

It is the purpose of the present invention to provide a rubber composition for a sidewall, a clinch and/or an insulation exhibiting superior rolling resistance and steering stability.

The present invention relates to a rubber composition for a sidewall, a clinch and/or an insulation comprising
20 to 60 parts by mass of filler,
1.0 to 4.0 parts by mass of sulfur and
0.1 to 10 parts by mass of at least one vulcanization accelerating aid selected from a group comprising a citraconimide compound, an organic thiosulfate compound, an alkylphenol-sulfur chloride condensate, a compound represented by the formula (2):

(2)

(wherein A is an alkylene group having 2 to 10 carbons, and $R^1$ and $R^2$ denote a mono-valent organic group independently including a nitrogen atom respectively) and a metal salt of methacrylic acid represented by the formula (3):

(wherein M is metal and x is an integer of 1 or 2)
based on 100 parts by mass of a diene rubber component comprising 10 to 70% by mass of at least one diene rubber component (a) selected from a group comprising a solution polymerization-modified styrene-butadiene rubber, a tin-modified butadiene rubber and a butadiene rubber whose terminal is modified with a compound represented by the formula (1):

(wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer), and 20 to 80% by mass of a diene rubber component (b) other than the diene rubber component (a).

The filler is preferably carbon black.

Further, the rubber composition includes preferably 0.2 to 5 parts by mass of at least one compound selected from a group comprising a cresol resin, a resorcin condensate and a modified resorcin condensate based on 100 parts by mass of the diene rubber component.

Further, the present invention also relates to a pneumatic tire having sidewall, a clinch and/or an insulation comprising the rubber composition for a sidewall, a clinch and/or an insulation.

| EXPLANATION OF SYMBOLS | |
|---|---|
| 1 | Base tread |
| 2 | Sidewall |
| 3 | Case cord |
| 4 | Band |
| 5 | Breaker |
| 6 | Inner liner |
| 7 | Cap tread |
| 8 | Insulation |
| 9 | Clinch |
| 10 | Bead core |

-continued

| EXPLANATION OF SYMBOLS | |
| --- | --- |
| 11 | Bead apex |
| 12 | Carcass ply |
| 13 | Chafer |

BEST MODE FOR CARRYING OUT THE INVENTION

The rubber composition of the present invention includes a diene rubber component including at least one diene rubber component (a) selected from a group comprising a solution polymerization-modified styrene-butadiene rubber (hereinafter, also referred to as S-SBR), a tin-modified butadiene rubber (hereinafter, also referred to as tin-modified BR) and a butadiene rubber whose terminal is modified with a compound represented by the formula (1):

(1)

(wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer)
and a diene rubber component (b) other than the diene rubber component (a), a filler, sulfur and a vulcanization accelerating aid.

The styrene-butadiene rubber (SBR) is S-SBR from reason that it has a few molecular chain terminals and is superior in low fuel cost because it has narrow molecular weight distribution and a few low molecular weight components, and is preferably those in which the polymerization initiation terminals of molecular chains or polymerization active terminals are modified to a configuration having interaction with silica. The example of the terminal configuration of such molecular chains includes a hydroxyl group, a carboxyl group and an amino group.

The styrene unit quantity of S-SBR is preferably 5 to 45% by mass and vinyl unit quantity is preferably 20 to 65% by mass. When the styrene unit quantity of S-SBR is less than 5% by mass and vinyl unit quantity exceeds 65% by mass, the productivity of tire production tends to be lowered because vulcanization speed is lowered. Tire performance tends to be inferior in abrasion resistance because chipping is generated. Further, when the styrene unit quantity of S—SBR exceeds 45% by mass and vinyl unit quantity is less than 20% by mass, low heat build-up property is inferior and rolling resistance tends to be unable to be reduced.

The content of S-SBR is preferably at least 10% by mass, preferably at least 15% by mass and more preferably at least 20% by mass in the diene rubber component because low heat build-up property is superior. Further, the content of S-SBR is preferably at most 80% by mass, more preferably at most 75% by mass and further preferably at most 70% by mass because strength at break is superior.

The tin-modified BR is obtained by polymerizing 1,3-butadiene by a lithium initiator and then adding a tin compound.

The lithium initiator includes lithium compounds such as an alkyl lithium, aryl lithium, vinyl lithium, organic tin lithium and organic nitrogen lithium compound, and lithium metal. The tin-modified BR with high vinyl and low cis content can be prepared by using the lithium initiator as the initiator of the tin-modified BR.

The tin compound includes tin tetrachloride, butyltin trichloride, dibutyltin dichloride, dioctyltin dichloride, tributyltin chloride, triphenyltin chloride, diphenyl dibutyltin, triphenyltin ethoxide, diphenyl dimethyltin, ditolyltin chloride, diphenyltin dioctanoate, divinyl diethyltin, tetrabenzyltin, dibutyltin distearate, tetraallyltin and p-tributyltin styrene. These tin compounds may be used alone and at least two kinds may be used in combination.

The content of tin atom in the tin-modified BR is preferably at least 50 ppm and more preferably at least 60 ppm. When the content of tin atom is less than 50 ppm, effect for promoting the dispersion of carbon black in the tin-modified BR is little and tan δ tends to be increased. Further, the content of tin atom is preferably at most 3000 ppm, more preferably at most 2500 ppm and further preferably at most 250 ppm. When the content of tin atom exceeds 3000 ppm, the extrusion processability of kneaded articles tends to be deteriorated because the cohesiveness of the kneaded articles is bad and edge is not arranged.

The molecular weight distribution (Mw/Mn) of the tin-modified BR is preferably at most 2 and more preferably at most 1.7. When Mw/Mn of the tin-modified BR exceeds 2, the dispersibility of carbon black is deteriorated and tan δ is increased. The lower limit of the molecular weight distribution is not specifically limited but is preferably 1.

The vinyl bond quantity of the tin-modified BR is preferably at least 5% by mass and more preferably at least 7% by mass. It tends to be difficult that the tin-modified BR in which the vinyl bond quantity of the tin-modified BR is less than 5% by mass is polymerized (produced). Further, the vinyl bond quantity of the tin-modified BR is preferably at most 50% by mass and more preferably at most 20% by mass. When the vinyl bond quantity of the tin-modified BR exceeds 50% by mass, the dispersibility of carbon black is deteriorated and tensile strength tends to be lowered.

Further, the BR whose terminal is modified with a compound represented by the formula (1):

(1)

(wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer) is preferable because it is chemically bonded with silica in order to improve adhesion property with silica.

The BR whose terminal is modified with a compound represented by the formula (1):

(1)

(wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer) can easily control the molecular weight distribution, can remove a low molecular weight component that is a factor of deteriorating rolling resistance and introduces functional groups at terminal easily because of living polymerization; therefore is preferably those obtained by introducing functional groups to BR obtained by solution polymerization.

In the BR whose terminal is modified with a compound represented by the formula (1):

(1)

(wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer), when $R^1$, $R^2$ and $R^3$ are for example, an ethoxy group, the modification rate of an ethoxysilyl group of the BR having an ethoxysilyl group at terminal is preferably at least 30% and more preferably at least 50% because bond quantity with silica is much and rolling resistance can be adequately reduced. Further, the modification rate of an ethoxysilyl group of the BR having an ethoxysilyl group at terminal is preferably at most 80% and more preferably at most 70% because interaction with silica is adequately obtained and processability at kneading a rubber is not lowered.

As the molecular weight distribution (Mw/Mn) of the BR whose terminal is modified with a compound represented by the formula (1):

(1)

(wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer), molecular weight distribution is preferably narrow because a low molecular weight component is not increased and rolling resistance is not deteriorated, and specifically, at most 2.3 is preferable and at most 2.2 is more preferable. Further, the lower limit of the molecular weight distribution is not specifically limited but is preferably 1.

The BR modified with a compound represented by the formula (1):

(1)

is preferable because it can improve bonding property with silica and improve the dispersibility of silica when it includes silica as a filler.

The specific example of the formula (1) includes, for example,

Vinyl bond content in the BR whose terminal is modified with a compound represented by the formula (1):

(1)

(wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer) is preferably at most 35% by mass, more preferably at most 30% by mass and further preferably at most 25% by mass because rim chafing property is superior. Further, the vinyl bond content in the BR modified with a compound represented by the formula (1) is preferably at least 5% by mass, more preferably at least 7% by mass and further preferably at least 10% by mass because production efficiency is superior.

The content of the diene rubber component (a) is at least 10% by mass, preferably at least 15% by mass and more preferably at least 20% by mass in the diene rubber component because low heat build-up property is superior. Further, the content of the diene rubber component (a) is preferably at most 70% by mass because strength at break and processability are superior.

Other diene rubber component (b) is rubbers other than S—SBR and the modified BR. Specifically, it includes a natural rubber (NR), an isoprene rubber (IR), the tin-modified BR and a butadiene rubber (BR) other than the BR whose terminal is modified with a compound represented by the formula (1):

(1)

(wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer), SBR other than S-SBR and a butadiene rubber (SPB-containing BR) including 1,2-syndiotactic polybutadiene crystals. Among them, NR is preferable because it is superior in strength at break.

The content of the other diene rubber component (b) is at least 20% by mass and preferably at least 25% by mass in the diene rubber component because strength at break and processability are superior. Further, the content of the other diene rubber component (b) is at most 80% by mass, preferably at most 70% by mass and more preferably at most 65% by mass because it can suppress reversion and can reduce tan δ.

Further, it is preferable that BR with high cis content is not included because it is more inferior to the modified BR in a view point that tan δ can be reduced.

The example of reinforcing filler includes carbon black, silica, calcium carbonate, clay, alumina, aluminum hydroxide and talc. And carbon black is preferable because adequate hardness and reinforcing property are easily obtained. And silica is preferable because low heat build-up property is superior and elongation at break is superior.

The content of the reinforcing filler is at least 20 parts by mass, preferably at least 23 parts by mass and more preferably at least 25 parts by mass based on 100 parts by mass of the diene rubber component because strength at break is superior. Further, the content of the reinforcing filler is at most 60 parts by mass, preferably at most 45 parts by mass, more preferably at most 40 parts by mass, further preferably at most 35 parts by mass and further preferably at most 33 parts by mass based on 100 parts by mass of the diene rubber component because low heat build-up property is superior.

Further, a silane coupling agent may be included for improving the dispersibility of the reinforcing filler. The example of the silane coupling agent includes sulfides series such as
bis(3-triethoxysilylpropyl)tetrasulfide,
bis(2-triethoxysilylethyl)tetrasulfide,
bis(4-triethoxysilylbutyl)tetrasulfide,
bis(3-trimethoxysilylpropyl)tetrasulfide,
bis(2-trimethoxysilylethyl)tetrasulfide,
bis(4-trimethoxysilylbutyl)tetrasulfide,
bis(3-triethoxysilylpropyl)trisulfide, bis(2-triethoxysilylethyl)trisulfide,
bis(4-triethoxysilylbutyl)trisulfide,
bis(3-trimethoxysilylpropyl)trisulfide,
bis(2-trimethoxysilylethyl)trisulfide,
bis(4-trimethoxysilylbutyl)trisulfide, bis(3-triethoxysilylpropyl)disulfide,
bis(2-triethoxysilylethyl)disulfide, bis(4-triethoxysilylbutyl)disulfide,
bis(3-trimethoxysilylpropyl)disulfide,
bis(2-trimethoxysilylethyl)disulfide, bis(4-trimethoxysilylbutyl)disulfide,
3-trimethoxysilylpropyl-N,N-dimethylthiocarbamoyltetrasulfide,
3-triethoxysilylpropyl-N,N-dimethylthiocarbamoyltetrasulfide,
2-triethoxysilylethyl-N,N-dimethylthiocarbamoyltetrasulfide,
2-trimethoxysilylethyl-N,N-dimethylthiocarbamoyltetrasulfide,
3-trimethoxysilylpropylbenzothiazolyltetrasulfide,
3-triethoxysilylpropylbenzothiazolyltetrasulfide, 3-triethoxysilylpropyl methacrylate monosulfide and 3-trimethoxysilylpropyl methacrylate monosulfide; mercapto series such as
3-mercaptopropyltrimethoxysilane, 3-mercaptopropyltriethoxysilane,
2-mercaptoethyltrimethoxysilane and 2-mercaptoethyltriethoxysilane;
vinyl series such as vinyl triethoxysilane and vinyl trimethoxysilane;
amino series such as 3-aminopropyltriethoxysilane,
3-aminopropyltrimethoxysilane,
3-(2-aminoethyl)aminopropyltriethoxysilane and
3-(2-aminoethyl)aminopropyltrimethoxysilane; glycidoxy series such as
γ-glycidoxypropyltriethoxysilane, γ-glycidoxypropyltrimethoxysilane,
γ-glycidoxypropylmethyldiethoxysilane and
γ-glycidoxypropylmethyldimethoxysilane; nitro series such as
3-nitropropyltrimethoxysilane and 3-nitropropyltriethoxysilane; chloro series such as 3-chloropropyltrimethoxysilane,
3-chloropropyltriethoxysilane, 2-chloroethyltrimethoxysilane and
2-chloroethyltriethoxysilane.

The content of the silane coupling agent is at least 6 parts by mass, preferably at least 7 parts by mass and more preferably at least 8 parts by mass based on 100 parts by mass of the reinforcing filler because the dispersibility of the reinforcing filler is improved, the re-agglomeration of silica is prevented and tan δ can be reduced. Further, the content of the silane coupling agent is preferably at most 10 parts by mass, more preferably at most 9 parts by mass and further preferably at most 8 parts by mass based on 100 parts by mass of the reinforcing filler because it does not lower strength at break. Further, when the content of the silane coupling agent having a sulfur atom exceeds 10 parts by mass based on 100 parts by mass of the reinforcing filler, sulfur is discharge and crosslinking tends to be tight more than necessary.

Insoluble sulfur generally used in the rubber industry can be preferably used as sulfur.

The content of sulfur is at least 1.0 part by mass, preferably at least 1.2 parts by mass and more preferably at least 1.3 parts by mass based on 100 parts by mass of the diene rubber component because hardness (Hs) is improved to be good. Further, the content of sulfur is at most 4.0 parts by mass, preferably at most 3.8 parts by mass and more preferably at most 3.6 parts by mass based on 100 parts by mass of the diene rubber component because strength at break is superior. Further, when insoluble sulfur is used as sulfur, the content of sulfur indicates the content of pure sulfur excluding oil.

The rubber composition of the present invention further includes at least one vulcanization accelerating aid selected from a group comprising a citraconimide compound, an organic thiosulfate compound, an alkylphenol sulfur chloride condensate, a compound represented by the formula (2):

$$R^1\text{—S—S-A-S—S—}R^2 \tag{2}$$

(wherein A is an alkylene group having 2 to 10 carbons, and $R^1$ and $R^2$ denote a mono-valent organic group independently including a nitrogen atom respectively)
and the metal salt of a methacrylic acid represented by the formula (3):

(3)

(wherein M is metal and x is an integer of 1 or 2) as a vulcanization accelerating aid.

The citraconimide compound is preferably bis-citraconimides because they are thermally stable and superior in dispersibility in a rubber. Specifically, there are mentioned 1,2-bis(citraconimide methyl)benzene, 1,3-bis(citraconimide methyl)benzene, 1,4-bis(citraconimide methyl)benzene, 1,6-bis(citraconimide methyl)benzene, 2,3-bis(citraconimide methyl)toluene, 2,4-bis(citraconimide methyl)toluene, 2,5-bis(citraconimide methyl)toluene, 2,6-bis(citraconimide methyl)toluene, 1,2-bis(citraconimide ethyl)benzene, 1,3-bis(citraconimide ethyl)benzene, 1,4-bis(citraconimide ethyl)benzene, 1,6-bis(citraconimide ethyl)benzene, 2,3-bis(citraconimide ethyl)toluene, 2,4-bis(citraconimide ethyl)toluene, 2,5-bis(citraconimide ethyl)toluene and 2,6-bis(citraconimide ethyl)toluene. Among them, 1,3-bis(citraconimide methyl)benzene is preferable because it is thermally stable and superior in the dispersibility in a rubber.

1,3-Bis(citraconimide methylbenzene is represented by the following formula:

The organic thiosulfate compound is represented by the following formula:

MO$_3$S—S—(CH$_2$)$_m$—S—SO$_3$M (Wherein m is 3 to 10, and M is lithium, potassium, sodium, magnesium, calcium, barium, zinc, nickel or cobalt. Further, crystal water may be included.).

m is preferably 3 to 10 and more preferably 3 to 6. When m is at most 2, adequate thermal fatigue resistance tends not to be obtained and when m is at least 11, the improvement effect of thermal fatigue resistance tends to be little nevertheless the increase of molecular weight.

M is preferably lithium, potassium, sodium, magnesium, calcium, barium, zinc, nickel or cobalt and potassium or sodium is preferable.

Further, crystal water may be included in the molecule.

Specifically, sodium salt monohydrate and sodium salt dihydrate are mentioned and a derivative from sodium thiosulfate, for example, sodium 1,6-hexamethylene dithiosulfate dihydrate is preferable from economical reason.

Sodium 1,6-hexamethylene dithiosulfate dihydrate is represented by the following formula:

The alkylphenol sulfur chloride condensate is represented by the following formula:

(wherein n is preferably at most 10).

x is same or different, either is an integer of 2 to 4 and 2 is preferable because the rubber composition can be efficiently hardened (suppression of reversion).

Either of R is an alkyl group having 5 to 12 carbons because dispersibility of the alkylphenol sulfur chloride condensate (B) in the diene rubber component is good, and is preferable an alkyl group having 6 to 9 carbons.

A is preferably an alkylene group in the compound represented by the formula (2):

(2)

$R^1$—S—S-A-S—S—$R^2$ (wherein A is an alkylene group having 2 to 10 carbons, and $R^1$ and $R^2$ denote a mono-valent organic group independently including a nitrogen atom respectively). As the alkylene group, linear, branched and cyclic groups are mentioned and are not specifically limited. Although either can be used, a linear alkylene group is preferable.

The carbon number of A is preferably 2 to 10 and more preferably 4 to 8. When the carbon number of A is at most 1, thermal stability is bad and merit obtained from S—S bond tends to be hardly obtained. When it is at least 11, length is longer than S-crosslinking chain and it tends to be hardly substituted in place of —$S_x$—.

The alkylene group satisfying the above-mentioned condition includes an ethylene group, a trimethylene group, a tetramethylene group, a pentamethylene group, a hexamethylene group, a heptamethylene group, an octamethylene group and a decamethylene group. Among them, a hexamethylene group is preferable because it is smoothly substituted with sulfur crosslinking between polymer/polymer and is also thermally stable.

$R^1$ and $R^2$ are preferably a mono-valent organic group independently including a nitrogen atom respectively, more preferably those including at least one aromatic ring, and further preferably those including a bond group represented by =N—C(=S)— in which a carbon atom is bonded with a dithio group.

$R^1$ and $R^2$ may be same or different respectively, but are preferably same because its production is easy.

The example of compounds satisfying the above-mentioned condition includes 1,2-bis(N,N'-dibenzylthiocarbamoyldithio)ethane,
1,3-bis(N,N'-dibenzylthiocarbamoyldithio)propane,
1,4-bis(N,N'-dibenzylthiocarbamoyldithio)butane,
1,5-bis(N,N'-dibenzylthiocarbamoyldithio)pentane,
1,6-bis(N,N'-dibenzylthiocarbamoyldithio)hexane,
1,7-bis(N,N'-dibenzylthiocarbamoyldithio)heptane,
1,8-bis(N,N'-dibenzylthiocarbamoyldithio)octane,
1,9-bis(N,N'-dibenzylthiocarbamoyldithio)nonane and
1,10-bis(N,N'-dibenzylthiocarbamoyldithio)decane.

Among them, 1,6-bis(N,N'-dibenzylthiocarbamoyldithio)hexane is preferable because it is thermally stable and superior in polarizing property.

The metal salt of methacrylic acid is represented by the formula (3):

(3)

In the formula, M is divalent metal and specifically zinc, magnesium, calcium, barium, strontium and nickel. Among them, zinc is preferable because products with high purity can be produced at low cost.

Further, the specific structural formula of the metal salt of methacrylic acid includes the formula (3a):

(3a)

and the formula (2b):

(3b)

(wherein M is same as the formula (3) and A is a hydroxyl group, a hydrogen atom or $OH \cdot H_2O$ hydrate type), may include singularly the formulae (3a) and (3b) respectively and may include the mixture of the formulae (3a) and (3b).

Further, when A is a hydroxyl group, the metal salt of methacrylic acid may be a hydrate.

Among the above-mentioned four kinds of the vulcanization accelerating aids, 1,3-bis(citraconimide methyl)benzene is preferable because since it does not include sulfur in a molecular structure, it is thermally stable and initial vulcanization velocity is not excessively fastened without discharging sulfur during vulcanization.

Among the above-mentioned four kinds of the vulcanization accelerating aids, the citraconimide compound is preferably included because $E^*$ can be heightened without affecting EB and scorch time. Further, the metal salt of methacrylic acid is preferably included because $E^*$ can be heightened without affecting EB and scorch time. Further, an antioxidant and stearic acid that have been conventionally used as the vulcanization accelerating aid can be suitably compounded if necessary. Since an effect obtained by compounding the citraconimide compound and the metal salt of methacrylic acid is common, $E^*$ can be further heightened without affecting EB and scorch time by using the citraconimide compound and the metal salt of methacrylic acid in combination.

The content of the at least one vulcanization accelerating aid selected from a group comprising a citraconimide compound, an organic thiosulfate compound, an alkylphenol-sulfur chloride condensate, compounds represented by the formulae (2) and (3) is preferably at least 0.1 part by mass and more preferably at least 0.5 part by mass based on 100 parts by mass of the diene rubber component because hardness is adequately obtained and low heat build-up property is superior. Further, the content of the vulcanization accelerating aid is preferably at most 10 parts by mass and more preferably at most 8 parts by mass based on 100 parts by mass of the diene rubber component because an effect of raising hardness is adequately obtained, cost is good and rubber scorch during processing and economical efficiency are superior.

The rubber composition of the present invention further includes preferably zinc oxide.

The zinc oxide may be usual zinc oxide exceeding an average particle diameter of 200 nm or fine particle zinc oxide having an average particle diameter of at most 200 nm that has been conventionally used in the rubber industry.

When usual zinc oxide is included as the zinc oxide in a sidewall and an insulation, the content of zinc oxide is preferably at least 3 parts by mass and more preferably at least 3.5 parts by mass based on 100 parts by mass of the diene rubber component because an effect of suppressing reversion is obtained and strength at break is superior. Further, the content of the usual zinc oxide is preferably at most 12 parts by mass and more preferably at most 10 parts by mass because since dispersibility is good, clumps not dispersed become starting points, strength at break is not extremely lowered and the fluctuation of strength at break is little.

When usual zinc oxide is included as the zinc oxide in a clinch, the content of zinc oxide is preferably 1.0 to 3 parts by mass based on 100 parts by mass of the diene rubber component in order to suppress abrasion (rim chafing) provoked at contact with a rim, considering balance with strength at break.

Compounding agents that have been conventionally used in the rubber industry, for example, aroma oil, wax, various vulcanization accelerators and vulcanization retarder such as N-cyclohexyl thiophthalamide (CTP) can be also compounded in the rubber composition of the present invention, in addition to the diene rubber component, the reinforcing filler, sulfur and the vulcanization accelerating aid.

The rubber composition of the present invention is produced by a general method. Namely, the rubber composition can be produced by kneading the compounding agents with a Banbury mixer, a kneader and an open roll and then vulcanizing the mixture.

Further, the rubber composition is used for a sidewall, for a clinch or for an insulation.

Further, the present invention also relates to a pneumatic tire using the rubber composition for a tire.

The sidewall, clinch and insulation in a tire having a sidewall, a clinch and an insulation using the rubber composition of the present invention as for a sidewall, for a clinch and for an insulation is described below, with reference to the drawings.

Figure 1:
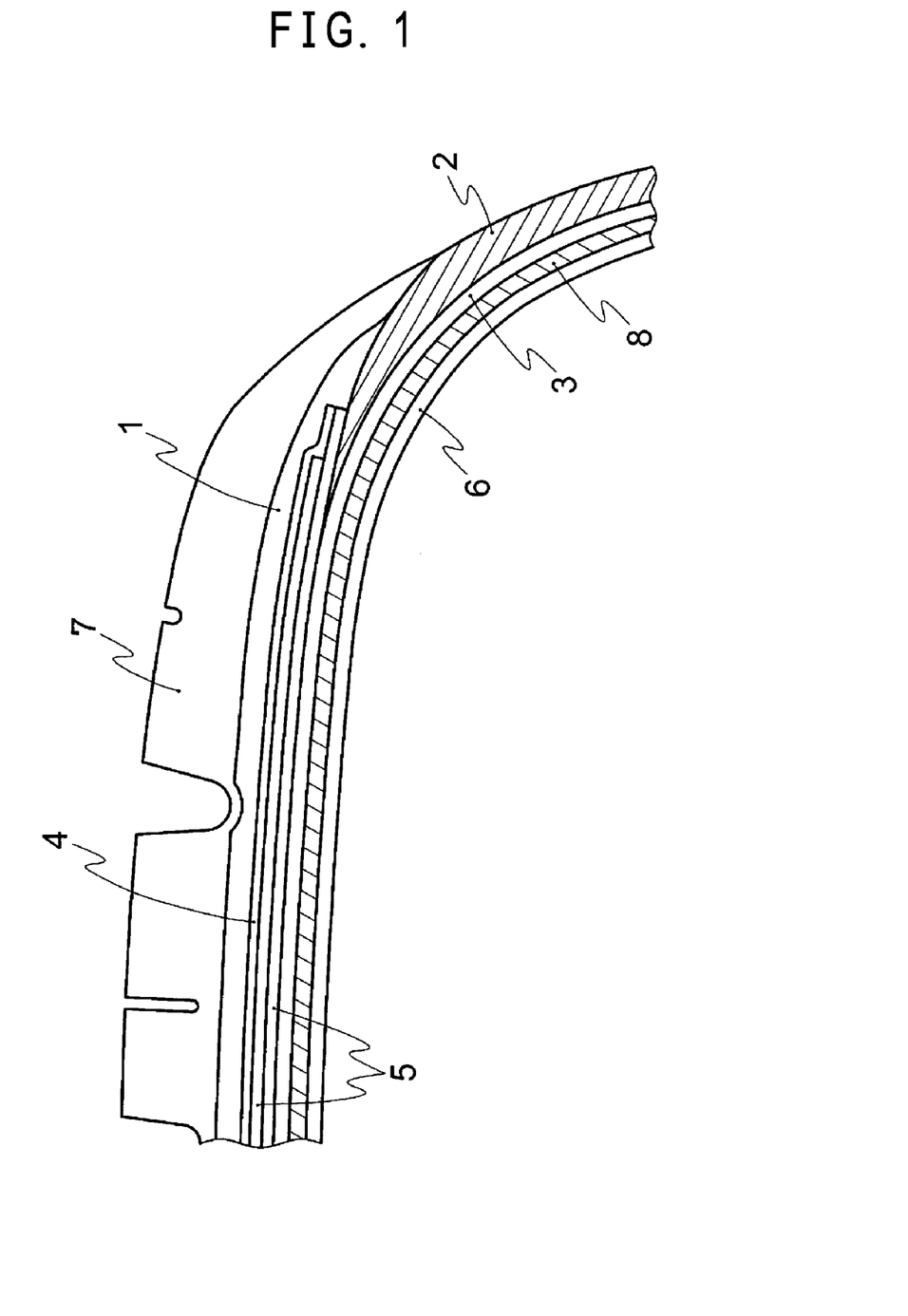
FIG. 1 is the partial cross-sectional view of a tire showing a structure having the sidewall, insulation and base tread using the rubber composition for a tire of the present invention.

FIG. 1 is the partial cross-sectional view of a tire showing a structure having an insulation and a sidewall using the rubber composition for a tire of the present invention. As shown in FIG. 1, a base tread 1 is a rubber layer in which a tread has a double layer structure comprising the base tread 1 and a cap tread 7 and that is provided at the inside of the cap tread 7 and the outside of the band 4, in a tire having the tread, a sidewall 2, a case cord 3 provided at the inside of the tread and sidewall 2, a band 4 provided at the inside of the tread and the outside of the case cord 3, a breaker 5 provided at the inside of the band 4 and the outside of the case cord 3 and an inner liner 6 provided at the inside of the case cord 3. And a base tread 1 is not required to improve abrasion resistance at the inner layer of the tread and has a role of making the whole tread be low heat build-up property and further has a role of absorbing impact from the tread and preventing the damage of band/breaker.

Further, as shown in FIG. 1, an insulation 8 is a rubber layer provided at the inside of the case cord 3 and the outside of the inner liner 6 in the tire structure, has a role of intervening adhesion property between the case cord and the inner liner and has a role of securing flex resistance. In particular, when the rubber composition of the present invention is used as the insulation, it is superior in tan δ (rolling resistance) and EB (durability).

Further, as shown in FIG. 1, the sidewall 2 is a rubber layer provided at the outside of the case cord 3 in the tire structure, has a role of absorbing impact from a road surface by flexure and has a role of preventing the case cord from external injury. In particular, when the rubber composition of the present invention is used as the sidewall, it is superior in tan δ (rolling resistance) and EB (durability).

Figure 2:
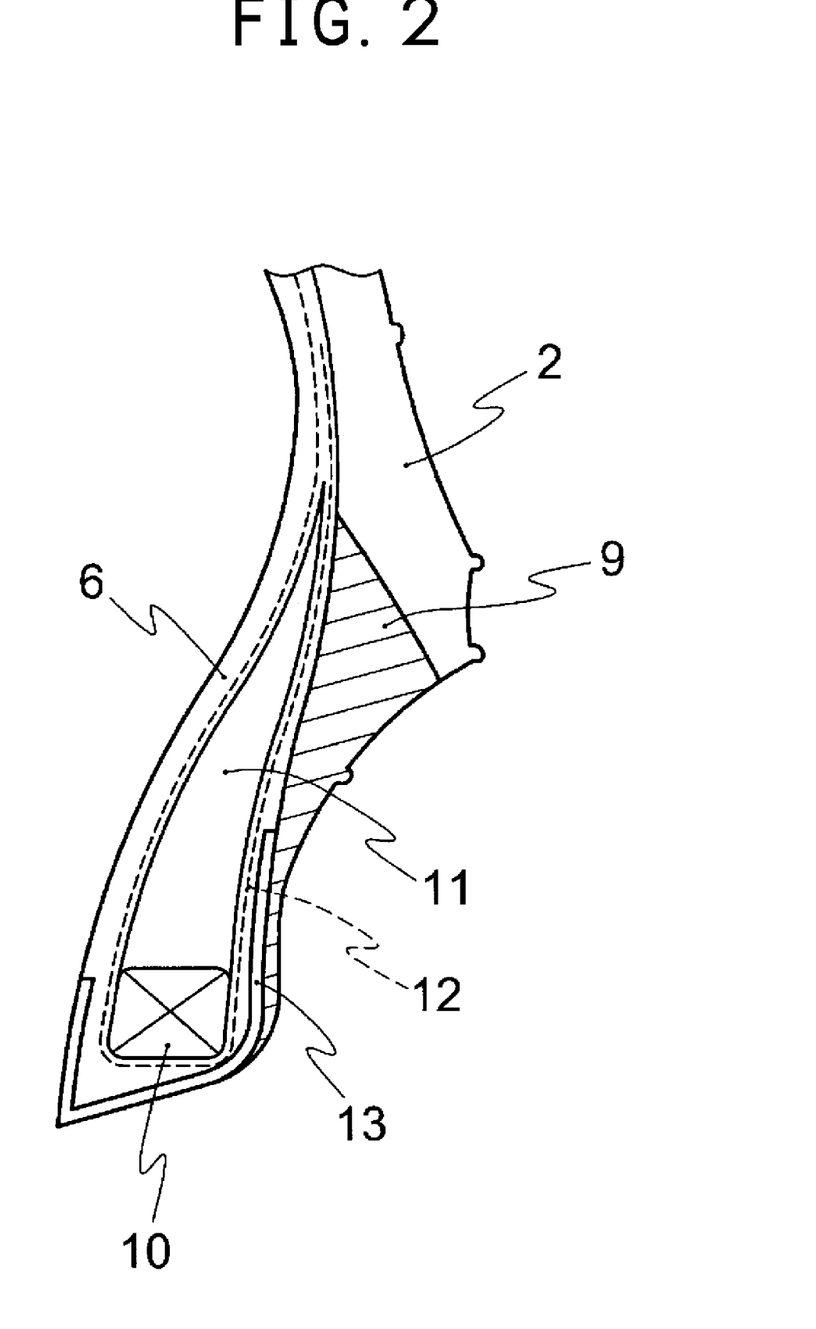
FIG. 2 is the partial cross-sectional view of a tire showing a structure having the clinch using the rubber composition for a tire of the present invention.

FIG. 2 is the partial cross-sectional view of a tire showing a structure having the clinch using the rubber composition of the present invention. As shown in FIG. 2, a clinch 9 is a rubber layer that is adjacent with a carcass ply 12 and provided from a sidewall 2 to a bead portion, in a tire having a bead portion comprising a bead core 10 and a bead apex 11, the carcass ply 12 provided at the periphery of the bead portion and the inside of the sidewall 2, an inner liner 6 provided at the inside of the sidewall 2 and a chafer 13 provided at a portion where the rim graze, and has a role of protecting a rim flange fitting portion. When the rubber composition of the present invention is used as the clinch, it is superior in tan δ (rolling resistance), EB (durability), rim chafing property (when the content of zinc oxide is little) and E* (steering stability).

The pneumatic tire of the present invention is produced by a usual method using the rubber composition of the present invention.

Namely, the rubber composition of the present invention in which the compounding agents were compounded if necessary is processed by extrusion in match with the shapes of the sidewall, clinch or insulation of tires at the stage of unvulcanization and the processed article is molded on a tire molding machine by a usual method to form an unvulcanized tire. The pneumatic tire is obtained by heating and pressurizing the unvulcanized tire in a vulcanizer.

EXAMPLES

The present invention will be described specifically based on Examples, but the present invention is not limited only to these.

Then, various chemicals used in Examples and Comparative Examples will be described in summary.
Natural Rubber (NR): RSS#3
Solution polymerization-modified styrene-butadiene rubber (solution polymerization-modified SBR): HPR 340 (Modified S-SBR, Styrene bond quantity: 10% by mass, coupled with alkoxysilane and introduced in terminal) manufactured by JSR Co., Ltd.
Tin-modified butadiene rubber (tin-modified BR): BR 1250 (Polymerization with a lithium initiator, Content of tin atom: 250 ppm, Vinyl content: 10 to 13% by mass, Mw/Mn: 1.5) manufactured by ZEON Corporation
Ethoxysilane-modified butadiene rubber (S-modified BR/butadiene rubber having an ethoxysilyl group at terminal): S-modified BR (BR modified a compound of the formula:

Vinyl content: 15% by mass) manufactured by Sumitomo Chemical Co., Ltd.
High cis content butadiene rubber (high cis BR): BR 150B manufactured by UBE Industries, Ltd.
SPB-containing BR: VCR 617 (Melting point of SPB: 200° C., Content of article insoluble in boiling n-hexane: 15 to 18% by mass, Content of SPB: 15 to 18% by mass) manufactured by UBE Industries, Ltd.
Carbon black N550: SHOUBLACK N550 available from CABBOT Japan K. K.
Carbon black N351H: N351H available from Mitsubishi Chemical Corporation
Silica: Z115GR($N_2$SA: 112 $m^2$/g) available from RHODIA S. A.
Silane coupling agent: Si69 (Bis(3-triethoxysilylpropyl)tetrasulfide) available from Degussa Corporation
Stearic acid: available from Nihon Oil & Fats Co., Ltd.
Zinc oxide: (Average particle diameter: 290 nm) available from Mitsui Mining and Smelting Co., Ltd.
Antioxidant 6C: NOCLAC 6C (N-1,3-dimethylbutyl-N'-phenyl-p-phenylenediamine) available from OUCHISHINKO CHEMICAL INDUSTRIAL CO., LTD.
Aromatic Oil: DIANA PROCESS AH-24 available from Idemitsu Kosan Co., Ltd.
Wax: SUNNOC available from OUCHISHINKO CHEMICAL INDUSTRIAL CO., LTD.
Insoluble sulfur (including 20% of oil): Crystex HSOT20 (Insoluble sulfur including at least 90% of insoluble article by carbon disulfide and 20% by mass of oil) available from Flexsys Chemicals Sdn. Bhd.
Insoluble sulfur (including 10% of oil): Seimisulfur (Insoluble sulfur including at least 60% of insoluble article by carbon disulfide and 10% by mass of oil) available from NIPPON KANRYU Industry Co., Ltd.
Vulcanization accelerator TBBS: NOCCELER NS (N-tert-butyl-2-benzothiazolylsulfenamide) manufactured by OUCHISHINKO CHEMICAL INDUSTRIAL CO., LTD.
HTS (Disodium salt dihydrate of hexamethylene bisthiosulfate): Duralink HTS available from Flexsys Chemicals Sdn. Bhd.
Zinc methacrylate: SR 709 available from SARTMER Co., Ltd.
Vulcanization accelerating aid (TACKROL V200): TACKROL V200 (Condensate of alkylphenol and sulfur chloride, in the following formula n is 0 to 10, R is an octyl group and x is 2.) available from Taoka Chemical Co., Ltd.

Vulcanization accelerating aid (PK900): PERKALINK 900 (1,3-bis(citraconimide methylbenzene) available from Flexsys Chemicals Sdn. Bhd.

Examples 1 to 32 and Comparative Examples 1 to 22

Tables 1 and 2 represent preferable compoundings as a sidewall and an insulation. 2.0 Parts by mass of stearic acid, 3.0 parts by mass of zinc oxide, 3.0 parts by mass of an antioxidant 6C, 5.0 parts by mass of aromatic oil and 1.0 part by mass of wax based on 100 parts by mass of a diene rubber component as compounding prescription and common chemicals shown in Tables 1 and 2 were compounded, and further, chemicals other than TACKROL V200 being the vulcanization accelerating aid shown in Tables 1 and 2, insoluble sulfur and vulcanization accelerator TBBS were kneaded using a Banbury mixer to obtain kneaded articles. Then, TACKROL V200 being the vulcanization accelerating aid, insoluble sulfur and vulcanization accelerator TBBS were added to the kneaded articles obtained and the mixture was kneaded to obtain unvulcanized rubber compositions. The vulcanized rubber compositions of Examples 1 to 32 and Comparative Examples 1 to 22 were prepared by vulcanizing the obtained unvulcanized rubber compositions by press at the condition of 170° C. for 12 minutes, and a viscoelasticity test and a tensile test below were carried out.

Further, Tables 3 and 4 represent preferable compoundings as a clinch. 2.0 Parts by mass of stearic acid, 2.0 parts by mass of zinc oxide, 2.0 parts by mass of an antioxidant 6C, 5.0 parts by mass of aromatic oil and 1.0 part by mass of wax based on 100 parts by mass of a diene rubber component as compounding prescription and common chemicals shown in Tables 3 and 4 were compounded.

(Viscoelasticity Test)

The complex elastic modulus (E*) and loss tangent (tan δ) of the vulcanized rubber compositions were measured under the conditions of a temperature of 30° C., a frequency of 10 Hz, an initial strain of 10% and a dynamic strain of 2%, using a viscoelasticity spectrometer VES (manufactured by Iwamoto Seisakusyo K. K.). It is indicated that the larger the E* is, the higher the rigidity is and the more superior the steering stability is. And the smaller the tan δ is, the more superior the low fuel cost is.

(Tensile Test)

Tensile test was carried out according to JIS K 6251, using No. 3 dumbbells comprising test rubber sheets that were deteriorated by thermal oxidation under the condition of a temperature of 100° C. for 72 hours and elongation at break (EB) was measured.

Further, the extrusion molding of the unvulcanized rubber compositions was carried out with an extruder equipped with a pipe sleeve with a predetermined shape to obtain rubber compositions with a sidewall shape, a clinch shape and an insulation shape respectively. The following measurement was carried out for respective test samples. Further, the rubber compositions obtained were laminated on a tire molding machine by a predetermined method to prepare a tire low cover, the pneumatic tires (size: 195/65R15, GTO65, tires for summer for an automobile, rim size (15×6JJ)) of Examples 1 to 36 and Comparative Examples 1 to 22 were prepared by way of trial by vulcanizing this in a mold, and durability test and the measurement test of rim chafing property and steering stability performance below were carried out.

(Durability Test)

The tires ran on a drum at a speed of 20 km/h under the condition of 230% load by JIS Specification. The running was stopped when damage (damage blister and crack in a tread, a sidewall and a bead, the visual detection and the generation of air leak) was generated. The durability index of Comparative Example 1 was referred to as 100 and the durability performance of respective compoundings was displayed by indices with the following equation. Here, it is indicated that the larger the durability index is, the more superior the durability is.

(Durability index)=(Running distance of each compounding)÷(Running distance of Comparative Example 1)×100 (Rim chafing property)

After the tires ran on a drum at a speed of 20 km/h for 600 hours under the condition of the maximum load (maximum inner pressure condition) of 230% load by JIS Specification, the abrasion depth of rim flange contact portion was measured. The rim chafing property index of Comparative Example 1 was referred to as 100 and the abrasion depth of respective compoundings was displayed by indices. Here, it is indicated that the larger the rim chafing property index is, the less the abrasion (depth) of the rim flange contact portion is. And in that case, it is preferable that rim misalignment hardly occurs.

(Steering Stability)

The test tires were loaded on the front wheel of a vehicle (domestic FF 2000 cc), in-vehicle running was carried out on a test course and steering stability was evaluated by the sensory evaluation of a driver. For evaluation, 6 point was perfect score and Comparative Example 1 was referred to as 5 point to carry out relative evaluation. It is indicated that the larger the evaluation point is, the better the steering stability is.

Tables 1, 2, 3 and 4 show the test results of the test with respect to the above-mentioned vulcanized rubber compositions and the test with respect to the pneumatic tires.

Tables 1 and 2 show the test results concerning the pneumatic tires obtained by using the obtained vulcanized rubber compositions for the sidewall and the insulation.

Tables 3 and 4 show the test results concerning the pneumatic tires obtained by using the obtained vulcanized rubber compositions for the clinch.

TABLE 1

| Sidewall and insulation compoundings | Examples | | | | | | | | |
|---|---|---|---|---|---|---|---|---|---|
| | 1 | 2 | 3 | 4 | 5 | 6 | 7 | 8 | 9 |
| Compounding amount (parts by mass) | | | | | | | | | |
| NR | 60 | 60 | 60 | 60 | 60 | 60 | 60 | 60 | 60 |
| Tin-modified BR | 40 | — | 20 | 40 | 40 | 40 | 40 | 40 | 20 |

TABLE 1-continued

| Sidewall and insulation compoundings | | | | | | | | | |
|---|---|---|---|---|---|---|---|---|---|
| Solution polymerization SBR | — | 40 | 20 | — | — | — | — | — | 20 |
| S-modified BR | — | — | — | — | — | — | — | — | — |
| VCR 617 | — | — | — | — | — | — | — | — | — |
| High cis BR | — | — | — | — | — | — | — | — | — |
| Silica | 25 | 25 | 25 | 35 | 18 | — | — | 25 | 15 |
| Carbon black N550 | 12 | 12 | 12 | 12 | 12 | 37 | 47 | 12 | 22 |
| Silane coupling agent | 2.0 | 2.0 | 2.0 | 2.8 | 1.4 | — | — | 2.0 | 1.2 |
| Insoluble sulfur (including 20% of oil) | — | — | — | — | — | — | — | — | — |
| Insoluble sulfur (including 10% of oil) | 2.33 | 2.33 | 2.33 | 2.33 | 2.33 | 2.33 | 2.33 | 1.22 | 2.33 |
| Pure sulfur | 2.1 | 2.1 | 2.1 | 2.1 | 2.1 | 2.1 | 2.1 | 1.1 | 2.1 |
| Vulcanization accelerator TBBS | 1.4 | 1.4 | 1.4 | 1.4 | 1.4 | 1.4 | 1.4 | 3.1 | 1.4 |
| TACKROL V200 | 2.0 | 2.0 | 2.0 | 2.0 | 2.0 | 2.0 | 2.0 | 2.0 | 2.0 |
| PK 900 | — | — | — | — | — | — | — | — | — |
| Zinc methacrylate | — | — | — | — | — | — | — | — | — |
| HTS | — | — | — | — | — | — | — | — | — |
| Stearic acid | 2.0 | 2.0 | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 | 3.0 | 3.0 |
| Antioxidant 6C | 3.0 | 3.0 | 3.0 | 3.0 | 3.0 | 3.0 | 3.0 | 3.0 | 3.0 |
| Wax | 1.0 | 1.0 | 1.0 | 1.0 | 1.0 | 1.0 | 1.0 | 1.0 | 1.0 |
| Aromatic oil | 5.0 | 5.0 | 5.0 | 5.0 | 5.0 | 5.0 | 5.0 | 5.0 | 5.0 |
| Evaluation result | | | | | | | | | |
| E* 30° C. | 3.5 | 3.7 | 3.6 | 4.0 | 2.7 | 3.8 | 4.4 | 3.5 | 3.7 |
| tanδ | 0.090 | 0.092 | 0.088 | 0.100 | 0.090 | 0.088 | 0.108 | 0.087 | 0.086 |
| EB elongation at break (%) | 450 | 460 | 490 | 500 | 400 | 390 | 400 | 430 | 480 |
| Durability index | 105 | 110 | 120 | 120 | 90 | 85 | 80 | 90 | 120 |
| Steering stability performance index (perfect score is 6 point) | 5 | 5 | 5 | 6 | 3 | 5 | 6 | 5 | 5 |

| | Examples | | | | | | | |
|---|---|---|---|---|---|---|---|---|
| Sidewall and insulation compoundings | 10 | 11 | 12 | 13 | 14 | 15 | 16 | 17 |
| Compounding amount (parts by mass) | | | | | | | | |
| NR | 60 | 60 | 60 | 60 | 60 | 60 | 60 | 40 |
| Tin-modified BR | 40 | 40 | 40 | 40 | 40 | — | 20 | 30 |
| Solution polymerization SBR | — | — | — | — | — | — | — | 30 |
| S-modified BR | — | — | — | — | — | 40 | — | — |
| VCR 617 | — | — | — | — | — | — | 20 | — |
| High cis BR | — | — | — | — | — | — | — | — |
| Silica | 25 | 25 | 25 | 25 | 25 | 25 | 25 | 25 |
| Carbon black N550 | 12 | 12 | 12 | 12 | 12 | 12 | 12 | 12 |
| Silane coupling agent | 2.0 | 2.0 | 2.0 | 2.0 | 2.0 | 2.0 | 2.0 | 2.0 |
| Insoluble sulfur (including 20% of oil) | — | — | — | — | — | — | — | — |
| Insoluble sulfur (including 10% of oil) | 2.33 | 2.33 | 2.33 | 2.33 | 2.33 | 2.33 | 2.33 | 2.33 |
| Pure sulfur | 2.1 | 2.1 | 2.1 | 2.1 | 2.1 | 2.1 | 2.1 | 2.1 |
| Vulcanization accelerator TBBS | 1.4 | 1.4 | 1.4 | 1.4 | 1.4 | 1.4 | 1.4 | 1.4 |
| TACKROL V200 | — | 1.0 | — | — | 2.0 | 2.0 | 2.0 | 2.0 |
| PK 900 | 2.0 | 1.0 | — | — | 2.0 | — | — | — |
| Zinc methacrylate | — | — | — | 2.0 | — | — | — | — |
| HTS | — | — | 2.0 | — | — | — | — | — |
| Stearic acid | 2.0 | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 | 3.0 |
| Antioxidant 6C | 3.0 | 3.0 | 3.0 | 3.0 | 3.0 | 3.0 | 3.0 | 3.0 |
| Wax | 1.0 | 1.0 | 1.0 | 1.0 | 1.0 | 1.0 | 1.0 | 1.0 |
| Aromatic oil | 5.0 | 5.0 | 5.0 | 5.0 | 5.0 | 5.0 | 5.0 | 5.0 |
| Evaluation result | | | | | | | | |
| E* 30° C. | 3.3 | 3.4 | 3.2 | 3.8 | 3.9 | 3.6 | 4.0 | 3.9 |
| tanδ | 0.100 | 0.090 | 0.105 | 0.102 | 0.080 | 0.093 | 0.100 | 0.082 |
| EB elongation at break (%) | 490 | 500 | 470 | 510 | 400 | 430 | 430 | 430 |
| Durability index | 120 | 125 | 120 | 160 | 90 | 90 | 90 | 100 |
| Steering stability performance index (perfect score is 6 point) | 5 | 5 | 5 | 5 | 5 | 5 | 6 | 5 |

TABLE 2

| | Comparative Examples | | | | | | | | | | |
|---|---|---|---|---|---|---|---|---|---|---|---|
| Sidewall and insulation compoundings | 1 | 2 | 3 | 4 | 5 | 6 | 7 | 8 | 9 | 10 | 11 |
| Compounding amount (parts by mass) | | | | | | | | | | | |
| NR | 60 | 60 | 60 | 20 | 75 | 60 | 60 | 60 | 60 | 60 | 60 |
| Tin-modified BR | — | 40 | 40 | 80 | 25 | 40 | 40 | 40 | — | — | — |
| Solution polymerization SBR | — | — | — | — | — | — | — | — | — | — | — |

TABLE 2-continued

| Sidewall and insulation compoundings | Comparative Examples | | | | | | | | | | |
|---|---|---|---|---|---|---|---|---|---|---|---|
| | 1 | 2 | 3 | 4 | 5 | 6 | 7 | 8 | 9 | 10 | 11 |
| S-modified BR | — | — | — | — | — | — | — | — | — | — | — |
| VCR 617 | — | — | — | — | — | — | — | — | — | — | — |
| High cis BR | 40 | — | — | — | — | — | — | — | 40 | 40 | 40 |
| Silica | 25 | 45 | — | 25 | 25 | 25 | 25 | 25 | 25 | 25 | 25 |
| Carbon black N550 | 12 | 12 | 55 | 12 | 12 | 30 | 12 | 12 | 12 | 12 | 12 |
| Silane coupling agent | 2.0 | 3.6 | — | 2.0 | 2.0 | 2.0 | 2.0 | 2.0 | 2.0 | 2.0 | 2.0 |
| Insoluble sulfur (including 20% of oil) | — | — | — | — | — | — | 4.63 | — | — | — | — |
| Insoluble sulfur (including 10% of oil) | 2.33 | 2.33 | 2.33 | 2.33 | 2.33 | 2.33 | — | 0.56 | 2.33 | 2.33 | 2.33 |
| Pure sulfur | 2.1 | 2.1 | 2.1 | 2.1 | 2.1 | 2.1 | 3.7 | 0.5 | 2.1 | 2.1 | 2.1 |
| Vulcanization accelerator TBBS | 1.4 | 1.4 | 1.4 | 1.4 | 1.4 | 1.4 | 1.4 | 3.0 | 1.4 | 1.4 | 1.4 |
| TACKROL V200 | 2.0 | 2.0 | 2.0 | 2.0 | 2.0 | 2.0 | 2.0 | 2.0 | — | — | 1.0 |
| PK 900 | — | — | — | — | — | — | — | — | 2.0 | — | 1.0 |
| HTS | — | — | — | — | — | — | — | — | — | — | — |
| Stearic acid | 2.0 | 2.0 | 2.0 | 2.0 | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 | 3.0 | 3.0 | 3.0 | 3.0 |
| Antioxidant 6C | 3.0 | 3.0 | 3.0 | 3.0 | 3.0 | 3.0 | 3.0 | 3.0 | 3.0 | 3.0 | 3.0 |
| Wax | 1.0 | 1.0 | 1.0 | 1.0 | 1.0 | 1.0 | 1.0 | 1.0 | 1.0 | 1.0 | 1.0 |
| Aromatic oil | 5.0 | 5.0 | 5.0 | 5.0 | 5.0 | 5.0 | 5.0 | 5.0 | 5.0 | 5.0 | 5.0 |
| Evaluation result | | | | | | | | | | | |
| E* 30° C. | 3.7 | 4.4 | 4.7 | 3.2 | 3.3 | 4.6 | 5.1 | 3.0 | 3.4 | 2.8 | 3.6 |
| tanδ | 0.148 | 0.132 | 0.129 | 0.078 | 0.142 | 0.128 | 0.078 | 0.099 | 0.155 | 0.160 | 0.152 |
| EB elongation at break (%) | 480 | 500 | 400 | 330 | 590 | 470 | 320 | 350 | 540 | 530 | 500 |
| Durability index | 100 | 105 | 70 | 50 | 120 | 80 | 35 | 60 | 120 | 130 | 120 |
| Steering stability performance index (perfect score is 6 point) | 5 | 6 | 6 | 5 | 5 | 6 | 6 | 4 | 5 | 3 | 5 |

TABLE 3

| Clinch compounding | Examples | | | | | | | |
|---|---|---|---|---|---|---|---|---|
| | 18 | 19 | 20 | 21 | 22 | 23 | 24 | 25 |
| Compounding amount (parts by mass) | | | | | | | | |
| NR | 35 | 35 | 35 | 35 | 35 | 35 | 35 | 35 |
| Tin-modified BR | 65 | 45 | 65 | 65 | 65 | 65 | 65 | 65 |
| Solution polymerization SBR | — | 20 | — | — | — | — | — | — |
| S-modified BR | — | — | — | — | — | — | — | — |
| VCR 617 | — | — | — | — | — | — | — | — |
| High cis BR | — | — | — | — | — | — | — | — |
| Silica | 10 | 10 | 10 | — | — | 10 | 10 | 10 |
| Carbon black N351H | 35 | 35 | 45 | 45 | 55 | 35 | 35 | 35 |
| Silane coupling agent | — | — | — | — | — | — | — | — |
| Insoluble sulfur (including 20% of oil) | — | — | — | — | — | — | 3.25 | — |
| Insoluble sulfur (including 10% of oil) | 2.0 | 2.0 | 2.0 | 2.0 | 2.0 | 1.1 | — | 2.0 |
| Pure sulfur | 1.8 | 1.8 | 1.8 | 1.8 | 1.8 | 1.0 | 2.6 | 1.8 |
| Vulcanization accelerator TBBS | 2.8 | 2.8 | 2.8 | 2.8 | 2.8 | 3.5 | 1.2 | 2.8 |
| TACKROL V200 | 2.0 | 2.0 | 2.0 | 2.0 | 2.0 | 2.0 | 2.0 | — |
| PK 900 | — | — | — | — | — | — | — | 2.0 |
| Zinc methacrylate | — | — | — | — | — | — | — | — |
| HTS | — | — | — | — | — | — | — | — |
| Stearic acid | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 |
| Antioxidant 6C | 2.0 | 2.0 | 2.0 | 2.0 | 2.0 | 2.0 | 2.0 | 2.0 |
| Wax | 1.0 | 1.0 | 1.0 | 1.0 | 1.0 | 1.0 | 1.0 | 1.0 |
| Aromatic oil | 5.0 | 5.0 | 5.0 | 5.0 | 5.0 | 5.0 | 5.0 | 5.0 |
| Evaluation result | | | | | | | | |
| E* 30° C. | 5.5 | 5.6 | 6.0 | 5.8 | 6.4 | 5.5 | 5.8 | 5.3 |
| tanδ | 0.110 | 0.108 | 0.120 | 0.108 | 0.128 | 0.107 | 0.101 | 0.120 |
| EB elongation at break (%) | 300 | 340 | 350 | 240 | 250 | 280 | 200 | 340 |
| Durability index | 105 | 105 | 110 | 105 | 115 | 106 | 105 | 100 |
| Rim chafing index | 105 | 107 | 112 | 114 | 121 | 115 | 95 | 103 |
| Steering stability performance index (perfect score is 6 point) | 5 | 5 | 5 | 5 | 6 | 5 | 5 | 5 |

TABLE 3-continued

| Clinch compounding | Examples | | | | | | |
|---|---|---|---|---|---|---|---|
| | 26 | 27 | 28 | 29 | 30 | 31 | 32 |
| Compounding amount (parts by mass) | | | | | | | |
| NR | 35 | 35 | 35 | 35 | 35 | 35 | 35 |
| Tin-modified BR | 65 | 65 | 65 | 65 | — | 45 | 45 |
| Solution polymerization SBR | — | — | — | — | — | — | 20 |
| S-modified BR | — | — | — | — | 65 | — | — |
| VCR 617 | — | — | — | — | — | 20 | — |
| High cis BR | — | — | — | — | — | — | — |
| Silica | 10 | 10 | 10 | 10 | 10 | 10 | 10 |
| Carbon black N351H | 35 | 35 | 35 | 35 | 35 | 35 | 35 |
| Silane coupling agent | — | — | — | — | — | — | — |
| Insoluble sulfur (including 20% of oil) | — | — | — | — | — | — | — |
| Insoluble sulfur (including 10% of oil) | 2.0 | 2.0 | 2.0 | 2.0 | 2.0 | 2.0 | 2.0 |
| Pure sulfur | 1.8 | 1.8 | 1.8 | 1.8 | 1.8 | 1.8 | 1.8 |
| Vulcanization accelerator TBBS | 2.8 | 2.8 | 2.8 | 2.8 | 2.8 | 2.8 | 2.8 |
| TACKROL V200 | 1.0 | — | — | 2.0 | 2.0 | 2.0 | 2.0 |
| PK 900 | 1.0 | — | — | 2.0 | — | — | — |
| Zinc methacrylate | — | — | 2.0 | — | — | — | — |
| HTS | — | 2.0 | — | — | — | — | — |
| Stearic acid | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 |
| Antioxidant 6C | 2.0 | 2.0 | 2.0 | 2.0 | 2.0 | 2.0 | 2.0 |
| Wax | 1.0 | 1.0 | 1.0 | 1.0 | 1.0 | 1.0 | 1.0 |
| Aromatic oil | 5.0 | 5.0 | 5.0 | 5.0 | 5.0 | 5.0 | 5.0 |
| Evaluation result | | | | | | | |
| E* 30° C. | 5.4 | 5.2 | 5.8 | 5.9 | 5.6 | 6.0 | 5.9 |
| tan δ | 0.110 | 0.125 | 0.122 | 0.100 | 0.113 | 0.120 | 0.102 |
| EB elongation at break (%) | 350 | 320 | 360 | 250 | 280 | 280 | 280 |
| Durability index | 100 | 100 | 105 | 105 | 102 | 110 | 110 |
| Rim chafing index | 105 | 105 | 109 | 101 | 105 | 125 | 85 |
| Steering stability performance index (perfect score is 6 point) | 5 | 5 | 5 | 5 | 5 | 5 | 5 |

TABLE 4

| Clinch compounding | Comparative Examples | | | | | | | | | | |
|---|---|---|---|---|---|---|---|---|---|---|---|
| | 12 | 13 | 14 | 15 | 16 | 17 | 18 | 19 | 20 | 21 | 22 |
| Compounding amount (parts by mass) | | | | | | | | | | | |
| NR | 35 | 35 | 35 | 20 | 70 | 35 | 35 | 35 | 35 | 35 | 35 |
| Tin-modified BR | — | 65 | 65 | 80 | 30 | 65 | 65 | 65 | — | — | — |
| High cis BR | 65 | — | — | — | — | — | — | — | 65 | 65 | 65 |
| Silica | 10 | 35 | — | 10 | 10 | 10 | 10 | 10 | 10 | 10 | 10 |
| Carbon black N351H | 35 | 35 | 45 | 35 | 35 | 53 | 35 | 35 | 35 | 35 | 35 |
| Silane coupling agent | — | 2.8 | — | — | — | — | — | — | — | — | — |
| Insoluble sulfur (including 20% of oil) | — | — | — | — | — | — | 4.25 | — | — | — | — |
| Insoluble sulfur (including 10% of oil) | 2.0 | 2.0 | 2.0 | 2.0 | 2.0 | 2.0 | — | 0.89 | 2.0 | 2.0 | 2.0 |
| Pure sulfur | 1.8 | 1.8 | 1.8 | 1.8 | 1.8 | 1.8 | 3.4 | 0.8 | 1.8 | 1.8 | 1.8 |
| Vulcanization accelerator TBBS | 2.8 | 2.8 | 2.8 | 2.8 | 2.8 | 2.8 | 2.8 | 4.0 | 2.8 | 2.8 | 2.8 |
| TACKROL V200 | 2.0 | 2.0 | 2.0 | 2.0 | 2.0 | 2.0 | 2.0 | 2.0 | — | — | 1.0 |
| PK 900 | — | — | — | — | — | — | — | — | 2.0 | — | 1.0 |
| Stearic acid | 2.0 | 2.0 | 2.0 | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 | 2.0 | 2.0 | 2.0 |
| Antioxidant 6C | 2.0 | 2.0 | 2.0 | 2.0 | 2.0 | 2.0 | 2.0 | 2.0 | 2.0 | 2.0 | 2.0 |
| Wax | 1.0 | 1.0 | 1.0 | 1.0 | 1.0 | 1.0 | 1.0 | 1.0 | 1.0 | 1.0 | 1.0 |
| Aromatic oil | 5.0 | 5.0 | 5.0 | 5.0 | 5.0 | 5.0 | 5.0 | 5.0 | 5.0 | 5.0 | 5.0 |
| Evaluation result | | | | | | | | | | | |
| E* 30° C. | 5.7 | 6.4 | 6.7 | 5.2 | 5.3 | 6.6 | 7.1 | 5.0 | 5.4 | 4.8 | 5.6 |
| tan δ | 0.168 | 0.152 | 0.149 | 0.098 | 0.162 | 0.148 | 0.098 | 0.119 | 0.175 | 0.180 | 0.172 |
| EB elongation at break (%) | 330 | 350 | 250 | 180 | 440 | 320 | 170 | 200 | 390 | 380 | 350 |
| Durability index | 100 | 105 | 110 | 75 | 80 | 108 | 75 | 80 | 100 | 70 | 95 |
| Rim chafing index | 100 | 91 | 109 | 95 | 60 | 113 | 65 | 90 | 115 | 90 | 100 |
| Steering stability performance index (perfect score is 6 point) | 5 | 6 | 6 | 5 | 5 | 6 | 6 | 5 | 5 | 4 | 5 |

Industrial Applicability

According to the present invention, the tires have superior rolling resistance and steering stability by preparing a rubber composition for a sidewall, a clinch and/or an insulation in which specific diene rubber components and specific vulcanization accelerating aids are included.

The invention claimed is:

1. A pneumatic tire having a sidewall, a clinch and/or an insulation comprising a rubber composition comprising
   20 to 47 parts by mass of a filler,
   1.0 to 2.6 parts by mass of sulfur and
   0.1 to 10 parts by mass of a metal salt of methacrylic acid represented by the formula (3):

(3)

wherein M is metal and x is an integer of 1 or 2 based on
   100 parts by mass of a diene rubber component consisting of at least one diene rubber component (a) which is a butadiene rubber whose terminal is modified with a compound represented by the formula (1):

(1)

wherein $R^1$, $R^2$, and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom, and n is an integer, and
   25 to 65% by mass of a diene rubber component (b) other than the diene rubber component (a).

2. The pneumatic tire having a sidewall, a clinch and/or an insulation of claim 1, wherein the filler is carbon black.

3. The pneumatic tire having a sidewall, a clinch and/or an insulation of claim 1, further comprising 0.2 to 5 parts by mass of at least one compound selected from a group consisting of a cresol resin, a resorcin condensate and a modified resorcin condensate based on 100 parts by mass of the diene rubber component.

* * * * *